(No Model.)
R. H. HUNSTOCK & E. CHÁVEZ.
CLINICAL THERMOMETER.
No. 405,036. Patented June 11, 1889.
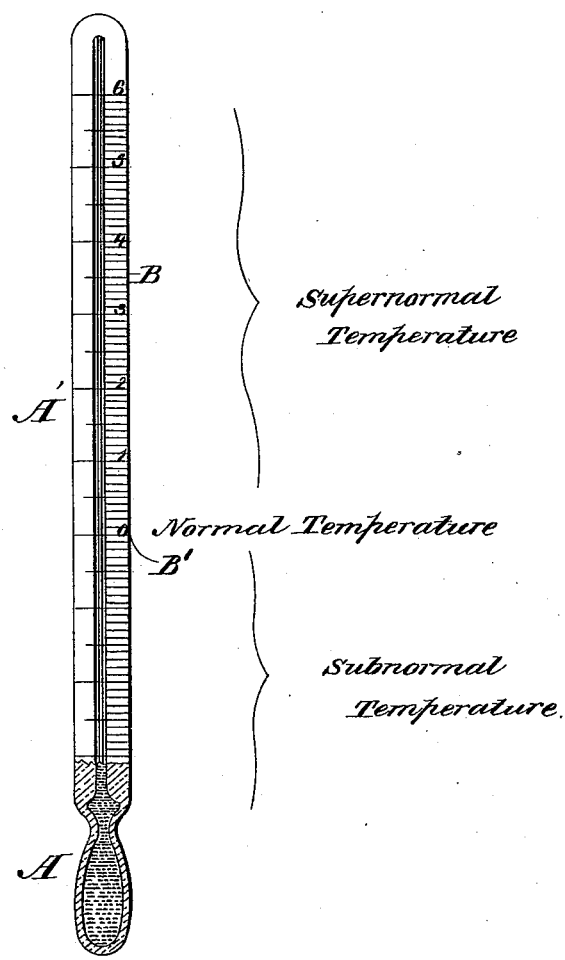

UNITED STATES PATENT OFFICE.

ROBERT H. HUNSTOCK, OF SAN ANTONIO, TEXAS, AND EMIGDIO CHÁVEZ, OF GUANAJUATO, MEXICO.

CLINICAL THERMOMETER.

SPECIFICATION forming part of Letters Patent No. 405,036, dated June 11, 1889.

Application filed March 5, 1889. Serial No. 301,933. (No model.)

*To all whom it may concern:*

Be it known that we, ROBERT H. HUNSTOCK, of San Antonio, in the county of Bexar and State of Texas, and EMIGDIO CHÁVEZ, of Guanajuato, Mexico, have invented a new and Improved Clinical Thermometer, of which the following is a full, clear, and exact description.

Our invention relates to an improvement in clinical thermometers; and it consists in placing the zero-mark of the scale at the normal temperature of the body.

Reference is to be had to the accompanying drawing, forming a part of this specification, in which the figure represents a side elevation of the instrument, partly in section.

The thermometer is preferably constructed of glass or similar transparent material, being provided with a mercury-bulb A, and channel A', extending longitudinally of the body.

Upon the body of the instrument a scale B, preferably equivalent to the centigrade, is produced, in which the zero-sign B' is placed at the normal temperature of the body, each degree being divided into five or ten parts according to the size of the instrument and reading supernormal and subnormal degrees. These when written are to be indicated, respectively, with a straight line above or below the numeral—as, for instance, 3.2° equals three and two-tenths degrees above zero or above the normal temperature of the body. 2.1° equals two and one-tenth degrees below zero or below the normal temperature of the body.

We do not confine ourselves to the use of a centigrade scale. If desired, Fahrenheit, Reaumur, or any other preferred scale may be employed. One or two scales may be made to appear upon the same instrument. We also desire it understood that we do not confine ourselves to any particular shape or size, and that the degrees of the scale may be divided as desired.

Having thus described our invention, what we claim as new, and desire to secure by Letters Patent, is—

1. A scale for thermometers having the zero-mark placed at the normal temperature of the body.

2. As an improved article of manufacture, a clinical thermometer, having a zero-mark of the scale placed at the normal temperature of the body, substantially as shown and described.

R. H. HUNSTOCK.
EMIGDIO CHÁVEZ.

Witnesses:
L. S. BRACKETT,
C. M. KINGSLEY,
J. A. CUMMING,
CARLOS I. CUMMING.